US011494985B2

(12) United States Patent
Coddington

(10) Patent No.: US 11,494,985 B2
(45) Date of Patent: Nov. 8, 2022

(54) SYSTEM AND METHOD FOR MAPPING AN INTERIOR SPACE

(71) Applicant: Timothy Coddington, Huntsville, AL (US)

(72) Inventor: Timothy Coddington, Huntsville, AL (US)

(*) Notice: Subject to any disclaimer, the term of this patent is extended or adjusted under 35 U.S.C. 154(b) by 0 days.

(21) Appl. No.: 17/044,762

(22) PCT Filed: Jun. 4, 2019

(86) PCT No.: PCT/US2019/035356
§ 371 (c)(1),
(2) Date: Oct. 1, 2020

(87) PCT Pub. No.: WO2019/236554
PCT Pub. Date: Dec. 12, 2019

(65) Prior Publication Data
US 2021/0110607 A1  Apr. 15, 2021

Related U.S. Application Data

(60) Provisional application No. 62/680,556, filed on Jun. 4, 2018.

(51) Int. Cl.
| G06T 19/00 | (2011.01) |
| G01C 15/00 | (2006.01) |
| G06T 7/579 | (2017.01) |
| G01S 17/894 | (2020.01) |
| G01S 17/08 | (2006.01) |
| G06K 9/62 | (2022.01) |

(52) U.S. Cl.
CPC .......... *G06T 19/003* (2013.01); *G01C 15/002* (2013.01); *G01S 17/08* (2013.01); *G01S 17/894* (2020.01); *G06K 9/6289* (2013.01); *G06T 7/579* (2017.01); *G06T 2207/10028* (2013.01); *G06T 2210/04* (2013.01); *G06T 2210/21* (2013.01)

(58) Field of Classification Search
CPC ..... G01C 15/002; G01S 17/89; G01S 17/894; G01S 17/08; G06K 9/6289; G06T 19/003; G06T 7/579; G06T 2207/10028; G06T 2210/04; G06T 2210/21
See application file for complete search history.

(56) References Cited

U.S. PATENT DOCUMENTS

| 5,102,224 | A | 4/1992 | Uesugi et al. |
| 6,917,893 | B2 | 7/2005 | Dietsch et al. |
| 7,697,126 | B2 | 4/2010 | Farsaie |
| 8,699,005 | B2 | 4/2014 | Likholyot |
| 9,453,719 | B2 * | 9/2016 | Schorr ................ G01C 15/002 |
| 9,470,792 | B2 | 10/2016 | Giger |
| 2004/0196282 | A1 * | 10/2004 | Oh .......................... G06T 17/00 345/419 |

(Continued)

*Primary Examiner* — Phi Hoang
(74) *Attorney, Agent, or Firm* — Patent Grove LLC; Tomas Friend

(57) ABSTRACT

A system and method for modeling an enclosed space involves measuring ranges and angles between a static vantage point and points on surfaces enclosing the space using a single point time of flight distance measuring device. A computer coupled to the distance measuring device generate virtual surfaces and calculates where the virtual surfaces intersect to generate a geometry for a 3D model representing the surfaces enclosing the space.

14 Claims, 8 Drawing Sheets

(56) References Cited

U.S. PATENT DOCUMENTS

| | | | |
|---|---|---|---|
| 2004/0252102 A1* | 12/2004 | Wilson | G06F 3/0346 |
| | | | 345/156 |
| 2013/0179119 A1 | 7/2013 | Coddington | |
| 2013/0259308 A1* | 10/2013 | Klusza | G06V 20/00 |
| | | | 382/103 |
| 2014/0368378 A1* | 12/2014 | Crain | G01S 13/9089 |
| | | | 342/25 A |
| 2017/0261595 A1* | 9/2017 | Wu | G06F 16/29 |
| 2018/0226105 A1* | 8/2018 | Brandt | H04N 5/91 |
| 2018/0260988 A1* | 9/2018 | Huang | G06T 19/20 |
| 2019/0188766 A1* | 6/2019 | Cho | G06Q 30/0621 |
| 2020/0374645 A1* | 11/2020 | Settel | G06F 3/167 |

* cited by examiner

SYSTEM AND METHOD FOR MAPPING AN INTERIOR SPACE

RELATED APPLICATIONS

This application is the U.S. National Stage application from PCT/US19/35356, which claims priority to U.S. provisional application Ser. No. 62/680,556 filed Jun. 4, 2018.

BACKGROUND OF THE INVENTION

Field of the Invention

The present invention relates to methods and systems for quickly mapping interior or indoor spaces using data from a single point time of flight distance measuring device, and optionally, a digital camera.

Description of Related Art

Interior spaces such as rooms, hallways, and other indoor structures can be mapped or modeled to produce floor plans that can be used for many purposes such as planning how to furnish the spaces, arrange displays in the spaces, evacuate in case of fire, and lay floor coverings. A variety of approaches have been used for modeling and/or mapping interior spaces and each approach comes with advantages and disadvantages that makes it better suited for some purposes than others.

LIDAR mapping systems use data from range finding laser devices (RFLDs) with rotating lasers that scan the environment many times per second to generate large amounts of data and create points clouds that cane be used to generate 3.dimensional (3D) models and/or floor plans. These systems can provide high accuracy and can even be automated to move through interior spaces to collect data and generate models and/or maps. The relatively high accuracy provided by LIDAR-type systems require precise location of the RFLD at each scan position, which requires the use of markers with known positions placed in the spaces to be modeled and/or the use of a simultaneous localization and mapping (SLAM) process that require complex algorithms and data fusion from multiple sensors. The relatively accurate models comes at the cost of expensive equipment and time consuming marker placement and/or SLAM algorithms, which make the systems expensive, complicated, and often require post processing to achieve reliable accuracy.

For example, U.S. Pat. No. 7,697,126 describes a system having a RFLD with a scan density and angular resolution of horizontal scan spacing down to 0.05° and a distance between adjacent vertical scan slices of 0.57" at 54 feet with a scan rate of 5,000 points per scan. The RFLD is configured to scan the field of view and fuse the scanned data with visual data. U.S. Pat. No. 6,917,893 describes a RFLD spatial data collection apparatus that collects while manually moved through an indoor space and correlates spatial data to generate a floor plan after data collection is complete. The generation of the floor plan is computationally expensive so data cannot be processed in real time and generating a 3D map requires a second RFLD and more computing time. US 2013/0179119 discloses range-finding laser device coupled to an operator that measures range and angle data points, pitch, roll, and yaw of the range finding laser device, and estimates the position, velocity, and yaw of the operator.

Less accurate but still useful maps or models of interior spaces may be produced using cameras that record visual images as well as depth (distance) data. For example, U.S. Pat. No. 9,470,792 describes a method for creating a model of an environment using a handheld distance measuring device comprising a laser distance meter and a camera. A first image of a first region of the environment is acquired from a first position while simultaneously measuring a first distance to a first target point in the first region. A second image of the first region is acquired from a second position of the distance measuring device while simultaneously measuring a second distance to the first target point or to another target point in the immediate environment of the first target point. A drawback of such a system is the need to determine the poses of the handheld imaging/range-finding device at different locations, which would require SLAM, reference point cloud data, or other complex processes to provide accurate models that may prevent real-time model/map generation. U.S. Pat. No. 8,699,005 describes a stationary indoor surveying apparatus that constructs a floor plan of an indoor environment. The surveying apparatus has a 2D range finder that measures 2D data sets that are projected onto a horizontal plane and aligned to construct a map. Data from a calibrated optical imaging system is used to process the constructed map to create floor plans and images correlated with the floor plans. Images for the imaging system can be used to establish positions of walls, doors, and windows and for drawing floor plans where projected 2D map information is missing. Use of an IMU is required for real time processing of data for visual assessment of site coverage.

The above mentioned and other existing technologies are intended to create maps or models of interiors spaces but there is a need for systems and methods that can generate maps on interior spaces at lower cost while retaining the features of real time processing for map/model generation and sufficient accuracy to be useful for the purposes of planning the furnishing and/or floor covering of spaces, the arrangement of displays, evacuations, and the like.

BRIEF SUMMARY OF THE INVENTION

The present invention provides for systems and methods that fill a need in the art for rapid generation of maps and/or models of interior spaces with sufficient accuracy to plan escape routes, placement of displays and furniture, renovation work, installation of flooring, and other tasks facilitated by knowledge of interior or enclosed spaces. The present systems and methods do not require LIDAR point cloud generation or complex SLAM algorithms that are more time consuming and require many complex calculations. The present system and method is capable of producing maps and/or models of interior spaces in real time as well as producing maps and/or models of interior spaces that are accurate enough for most applications of interior space mapping.

In a simplest embodiment, a method according to the invention comprises measuring angles and distances from a static vantage point to at least three points on each of the planar surfaces enclosing the space, generating a data set of distance and position data for each of the points, generating virtual planes corresponding to the planar surfaces, calculating where the virtual planes intersect, and using the virtual intersecting planes to generate a geometry for a 3D model representing the enclosed space. The 3D model and/or a 2D map of one or more of the planar surfaces may be displayed on a display in real time and, additionally or alternatively, be stored and/or transmitted to a remote device for subsequent display. A computer coupled to the stage and the distance measuring device (DMD) receives data from these components, generates the virtual planes, calculates intersections, and transmits data to a display. A user may identify the planar surfaces and, using a user input device coupled to the stage, aim the DMD manually to measure distances to at least three points on the identified planar surfaces. The stage may be motorized and connected to a user input device attached directly to the motorized stage or to the computer which, in turn, controls the stage. The method is preferably automated so that a digital camera coupled to the computer makes a digital image of surfaces enclosing the space from the vantage point and transmits image data to the computer, where an algorithm identifies likely planar surfaces and directs the stage to move the DMD into orientations, or positions, that target points on the likely planar surfaces.

In a simplest embodiment, a system of the invention comprises a single point time of flight distance measuring device (DMD) mounted to a movable stage attached to a static stand. The stage keeps track of the pitch and a yaw of the DMD and communicates with a computer, preferably also attached to the stand, that receives pitch and yaw data from the stage as well as distance data measured by the DMD associated with each pitch/yaw combination for which a distance measurement is made. The computer comprises software that generates virtual planes from pitch, yaw, and distance data, calculates where the virtual planes intersect, and generates a geometry for a 3D model representing the planar surfaces. A display receives model data and displays the geometry, preferably in real time. In a preferred embodiment, the stage is motorized and the system additionally comprises a digital camera for recording a digital optical image that sends image data to the computer, which comprises an algorithm that identifies likely planar surfaces from the image data and directs the motorized stage to move the DMD into positions that target points on the likely planar surfaces.

BRIEF DESCRIPTION OF THE DRAWINGS

The elements of the drawings are not necessarily to scale relative to each other, with emphasis placed instead upon clearly illustrating the principles of the disclosure. Like reference numerals designate corresponding parts throughout the several views of the drawings in which.

DETAILED DESCRIPTION OF THE INVENTION

All art specific terms used herein are intended to have their art-accepted meanings in the context of the description unless otherwise indicated. All non art specific terms are intended to have their plain language meaning in the context of the description unless otherwise indicated.

Real-Time (RT) refers to a method or process executed such that all of the steps proceed continuously and as data is input. There is no effective delay and input data is acted on immediately upon arrival to its logical conclusion or data in its final form. A delay of no more than one second between the collection of distance data and the display of the processed data is considered real time in the context of the present invention.

As used herein, an enclosed space is a space that is surrounded or confined by one or more structures or physical boundaries. An enclosed space is not necessarily an indoor space. Examples of an enclosed space include a space that is open on one side such as a run-in, an alley, a carport, or a loading dock.

As used herein, an interior space is a completely enclosed space such as an indoor space. Examples of an interior space include a room, an auditorium, an atrium, and a hallway.

A "vantage point" is a physical position that is static and offers a specific relationship to the structural environment that surrounds the position. Although there are many vantage points that may be chosen for placement of the system, some are better than others because the field of view for the distance measuring device (DMD) and camera, if present, resulting from one vantage point may provide direct line of sight to more enclosing surfaces than another vantage point. If both the DMD and digital camera are present, their vantage points may not be identical but, because they are attached to the same stand, the two vantage points are functionally identical because they are in close proximity to one another, as explained in the description of such embodiments.

Figure 1:
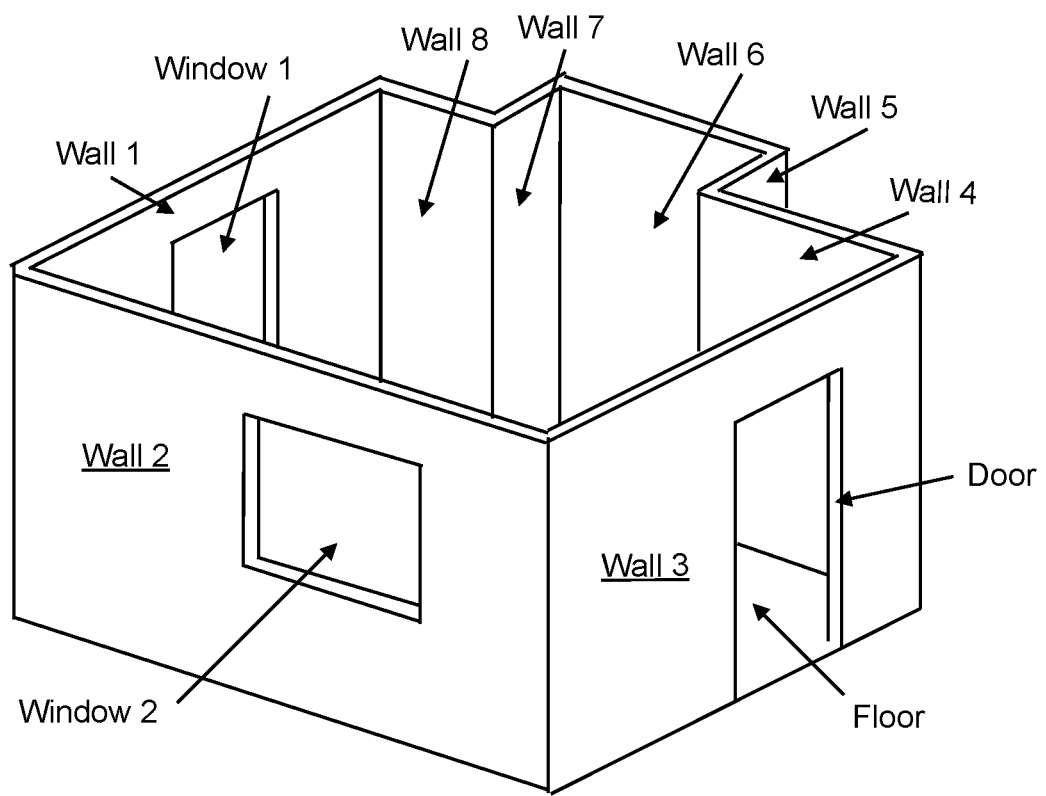
FIG. 1 is a view of a sample interior space.

FIG. 1 illustrates a sample interior space, in this case a room, to be modeled. The shape of the room is more complex than a simple cube shape and comprises a floor, eight walls (Wall 1-8), two windows (Window 1,2) and a door. A ceiling is not shown for simplicity but may be present as well. Identifiable planes in this room include the floor, the walls (Wall 1-8), the ceiling (if present) and optionally the windows (Window 1,2) and door. The planes of structures such as windows and doors may be identified whether they are filled, e.g. with window panes or a door, or not.

Figure 2:
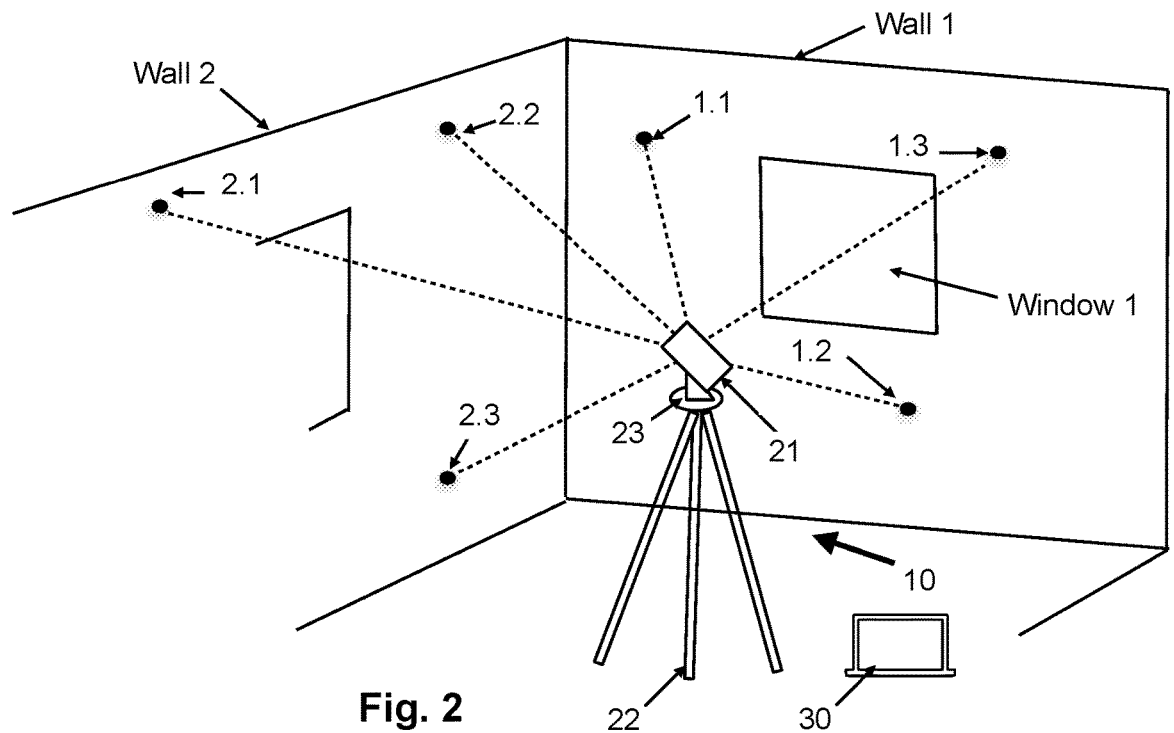
FIG. 2 is a view showing an interior space and an unspecified embodiment of a system according to the invention.

Using a most basic embodiment of a method according to the invention, a most basic embodiment of a system (10) is positioned at a vantage point in the room, for example, as shown in FIG. 2. The system (10) comprises a DMD (21) mounted on a stage (23), which is mounted to a stand (22). In this example, the stand (22) is essentially a tripod. Other examples may include stand comprising one or more wheels, a cart, or a motorized, mobile, remote controlled platform. The DMD (21) and stage (23) are coupled to a computer (30), which may also be mounted on the stand and in wired or wireless communication with the DMD (21) and stage (23). The computer (30) may be coupled directly to these devices or indirectly through a mobile device such as a wireless tablet or phone. An operator points the DMD (21) at three locations, or more, on each planar surface to be modeled.

Figure 3:
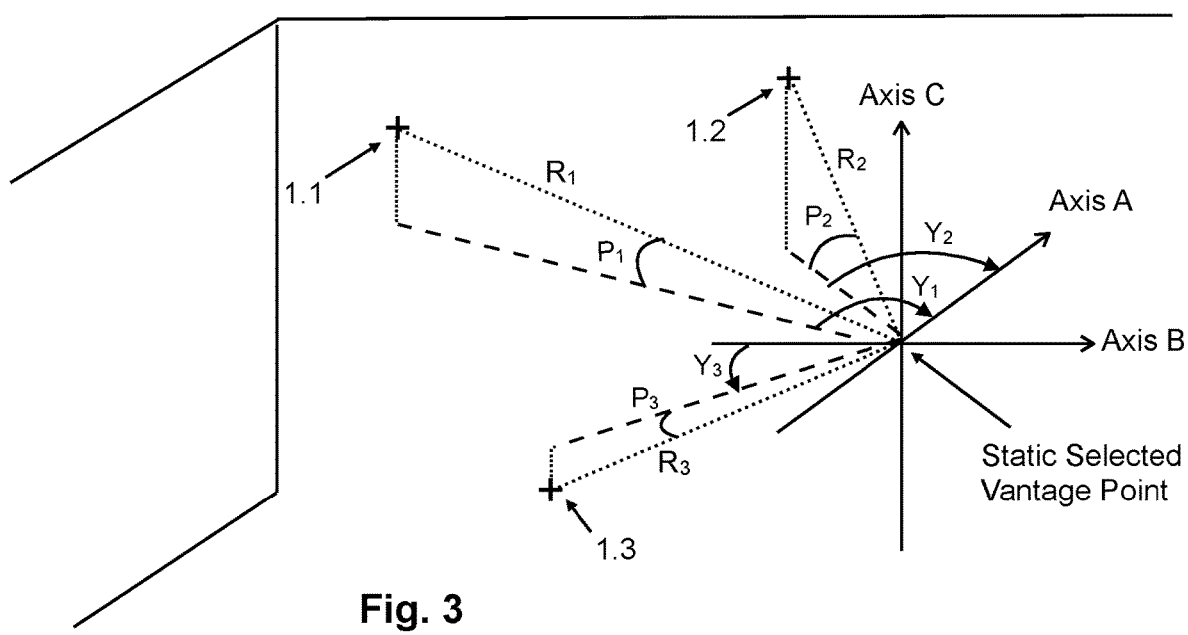
FIG. 3 is a diagram showing measurements made according to a method or a system according to the invention.

FIG. 2 illustrates the collection of distance data points 1.1, 1.2, and 1.3 on wall 1 and 2.1, 2.2, and 2.3 on wall 2. An operator may move the DMD (21) manually to aim at these points as the stage (23) tracks the precise pitch and yaw associated with each distance measured. The movement of the stage (23) may be moved directly by hand or by a user input device such as a joystick, keyboard, or touchscreen connected to a motorized stage (23). Data comprising the pitch, yaw, and distance for each point are received by the computer (30) and software uses these data to generate virtual, or theoretical, planes corresponding to wall 1 and wall 2 in a reference frame, preferably with the vantage point at the center. An illustration of the data collected is provided in FIG. 3. Three perpendicular spatial Cartesian axes, A, B, and C are shown with the center being at the vantage point, which is the static position of the system DMD. Points on wall 1 may be specified from the pitch angles (Pn) and the yaw angles (Yn) of points 1.1, 1.2, and 1.3 received from the stage (23) and the radial distance (Rn) from the vantage point. The three points define a virtual plane in which the surface of wall 1 lies. This process is repeated for walls 2-8 and the floor shown in FIG. 1 and the ceiling (not shown), if present.

Figure 5:
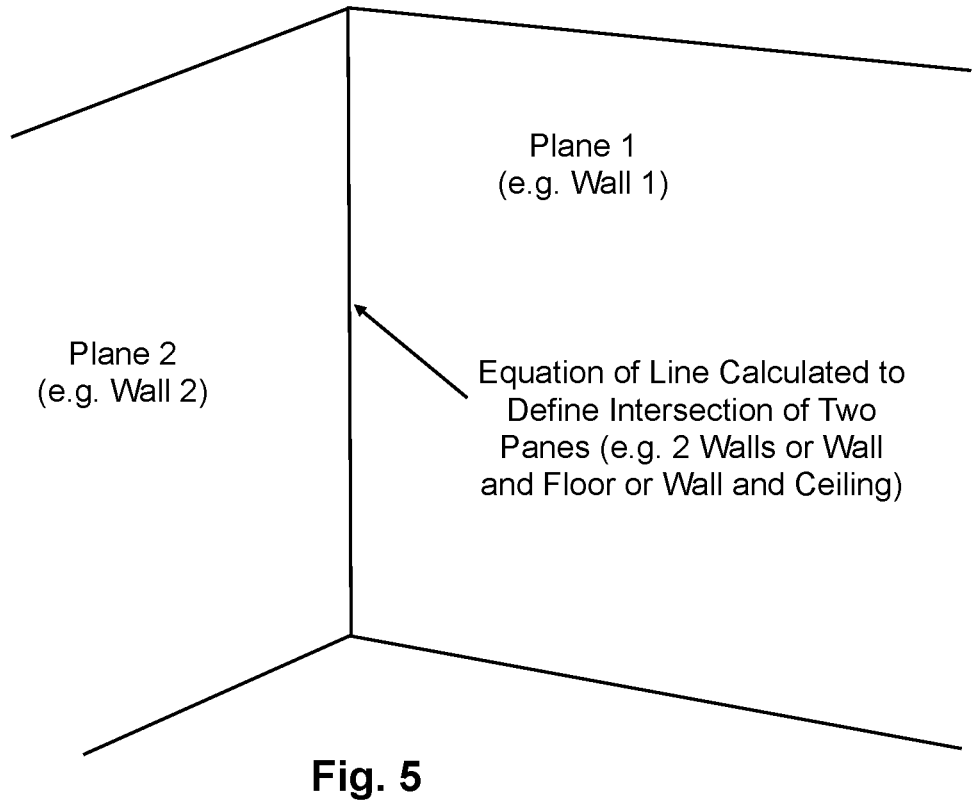
FIG. 5 is a depiction of a linear intersection of two planes.
Figure 6:
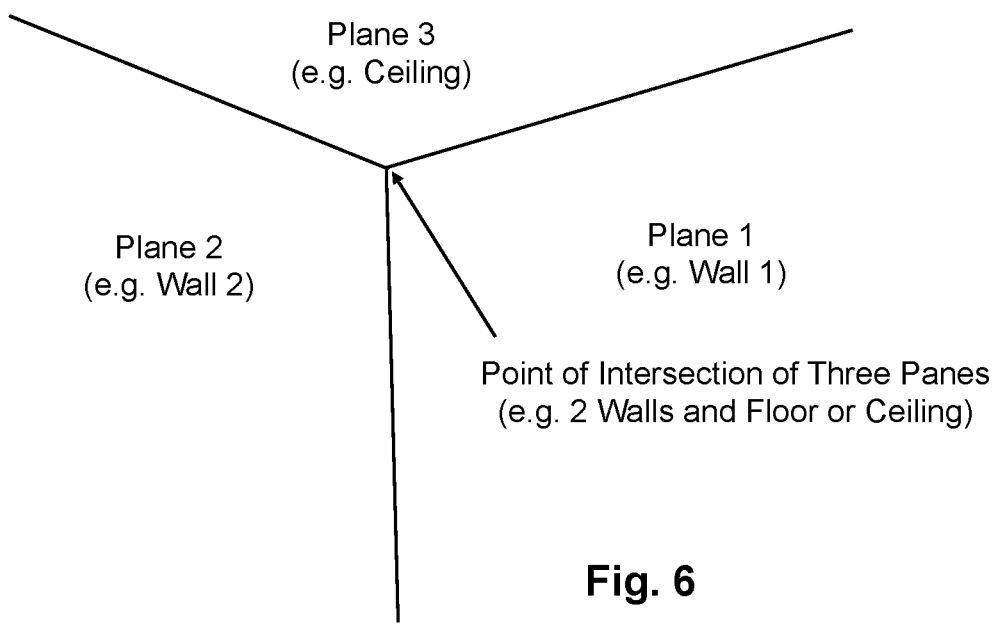
FIG. 6 is a depiction of a point intersection of three planes.

The software receives input and/or instructions, for example as part of a data receiving module, to correlate measured points with a virtual plane, for example as part of a modeling module. This may be done using a user input device such as a keyboard, button, switch, touchscreen, or the like, that indicates to the software which points belong on the same plane. The virtual planes generated need have no specific bounds. The software comprises a modeling module that calculates where the two planes corresponding to walls 1 and 2 intersect, as illustrated in FIG. 5, for example, along a line. The process also includes data from the floor and/or ceiling, which allows the modeling module to calculate the intersection of three virtual planes as shown in FIG. 6, for example, along three lines that intersect at a single point. To model all of the room, the process additionally includes data points from the rest of the walls.

Figure 4:
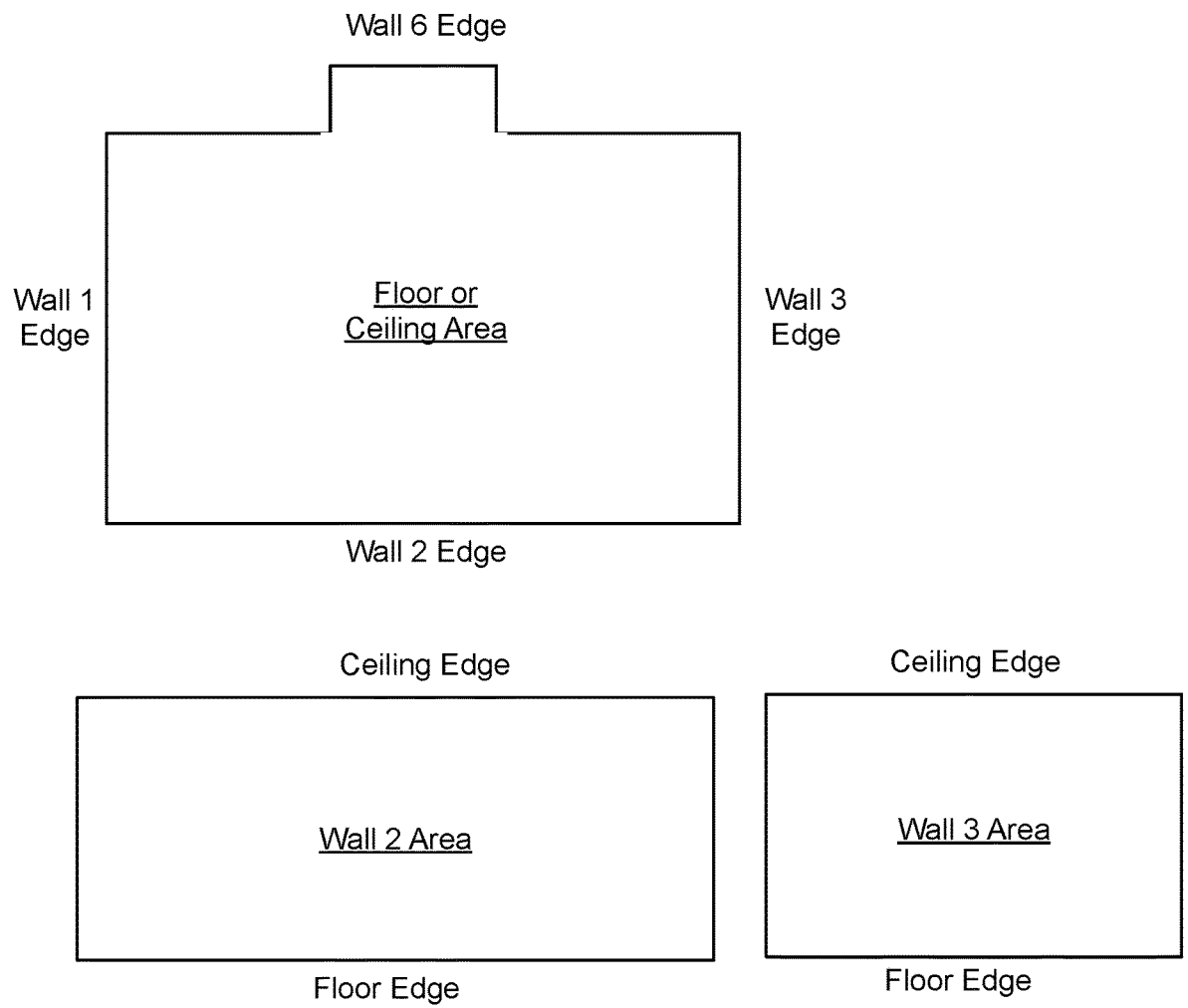
FIG. 4 is a diagram of sample model planar surfaces after plane intersections are calculated.

FIG. 4 illustrates 2D maps of the floor/ceiling, wall 2, and wall 3 of FIG. 1 that may be generated by a mapping module of the software from a 3D model of the room. The maps may be displayed on an electronic display and/or printed. In this example, the maps do not include window 2 in wall 2 or the door in wall 3. These may be included in the model of the room and the maps of the surfaces enclosing the rooms in several ways. For example, the system's data receiving module may allow an operator of the system to point the DMD at the corners of a window and/or a door and input indicating that range and pitch and yaw angle data points are associated with corners and/or edges of a specified window or door. In this way, the boundaries of a door and/or window plane within and coplanar with a plane of a wall may be defined for the modeling module that receives distance and angle data to calculate theoretical planes and their intersections. Although not shown in the drawings, built-in furniture such as benches, counters, cabinets, and the like may be identified and modeled in the same way as walls, floors, doors, and windows as long as the virtual planes corresponding to the surfaces intersect with walls, floors, the ceiling, and/or one another or the positions of the corners can be identified by measuring their corresponding Rn, Pn, and Yn values.

Figure 7:
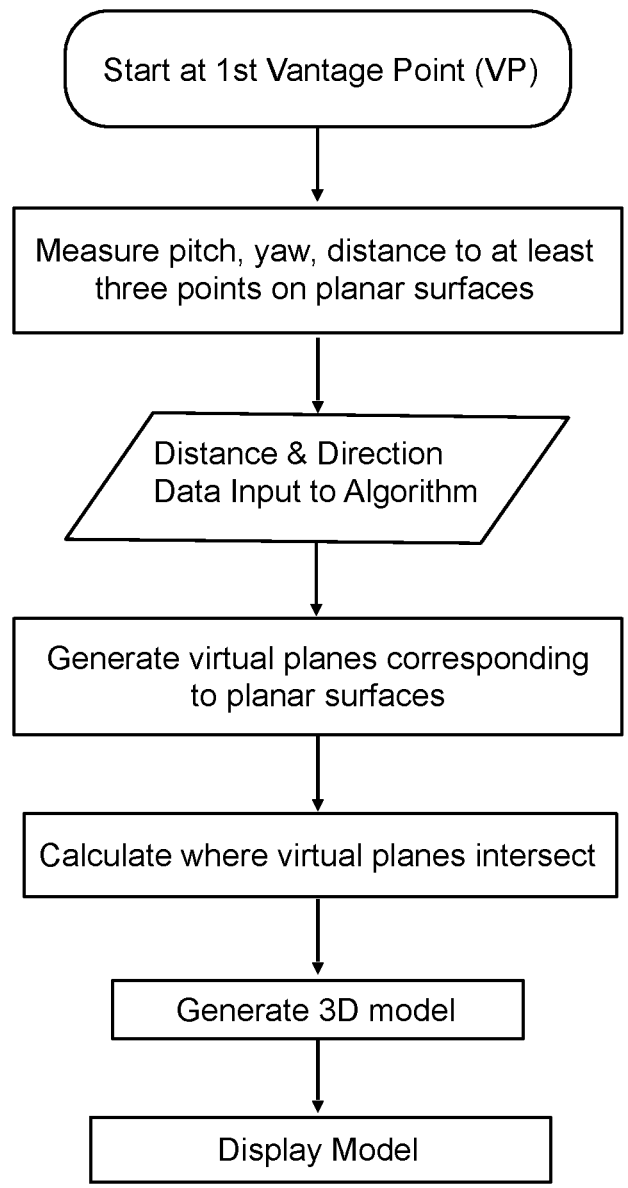
FIG. 7 is a flow chart for a first embodiment of a method according to the invention.

FIG. 7 is a flow chart illustrating method steps of a an embodiment of a method for collecting data and modeling an interior space. A system (10) is positioned at a selected vantage point in a space to be modeled. A system for performing this method comprises a stand (12), a DMD (21) on a movable stage (23) mounted on the stand (12), and a computer (30) preferably mounted to the stand (12). The stand (12) may be configured as a tripod or a type of platform or cart that may comprise one or more wheels (16) that allow the system to be moved without having to pick it up. The wheel(s) (16) may comprise an odometer that can be used to measure precise distances between vantage points and may additionally or alternatively be connected to one or more electric motors (50) that may be powered by a battery (50) to move the stand (12). The stand may additionally or alternatively comprise a handle (14) configured to be gripped by an operator to manually move the stand (12). The computer may be powered via a power cord and/or a battery (40) attached to the stand (12).

Once positioned at a vantage point, the DMD (21) may be moved and operated manually so as to measure a distance from the vantage point to a point on one of a number of planar surface enclosing the space. The DMD (21) is coupled to the computer (30) and data including the measured distance, or range, is transmitted the computer (30) and entered into a data receiving module or model building module of the software. The stage (23) is also coupled to the computer (30) and pitch and yaw data corresponding to each measured distance, or range, is transmitted to the computer and entered in the model building module. The operator may measure three or more ranges to points on each planar surface such as a wall, floor, ceiling, counter, or cabinet, depending on whether or not fixtures are to be included in the final 3D model. Additionally or alternatively, the operator may measure distances to corner points outlining planar surfaces including windows, doors, walls, ceilings, floors, and fixtures. Pitch and yaw values corresponding to each measured distance are provided to the model building module by the stage (23). For range measurements to points on planar surfaces, the operator provides input to the data receiving module or model building module indicating which points are to be grouped in the same plane. For measurements of points on the corner boundaries of planar surfaces, the operator provides input indicating which points comprise boundaries of the same planar surface.

The model building software comprises an algorithm that generates virtual planes corresponding to planar surfaces and calculates where the virtual planes intersect. The model building software may comprise a model building module that receives range, pitch, yaw, and user input data directly and/or the software may comprise a data receiving module that receives one or more of these data, which is provided to the model building module. The intersecting planes are used to generate a 3D model that may be displayed on a visual display, stored, and/or transmitted to another device for viewing and/or post processing. The 3D model may be used to generate a 2D map of a floor and/or other surfaces enclosing the space. IN a preferred embodiment, the model is in the form of a CAD model.

Once mapping is complete from a first vantage point, the system (10) may be moved from the first vantage point to a second vantage point for the process to be repeated. The precise distance and direction of movement from the first vantage point to the second vantage point may be used to convert or translate the model of the first vantage point to the reference frame of the second vantage point such that the models from the two vantage points may be combined into a single map in the reference frame of the second vantage point or vise versa. The precise distance and direction of movement from the first vantage point to the second vantage point may be measured using odometry if the stand (12) comprises odometry wheels.

The process of moving from one vantage point to another may be simplified by keeping the stage (23) to which the DMD is mounted at a constant vertical height or, if the height requires adjustment, the stage may itself be mounted to a device that measures the vertical height of the stage (23)

from the floor so that the height may be entered into the model building software and a change in height incorporated into a reference frame translation algorithm in the model building software. Additionally or alternatively, the operator may repeat distance measurements taken from the first vantage point from the second vantage point. The operator may enter into a translation algorithm of the model generating software information indicating which points are duplicate "reference" points so that the translation software module may calculate the exact position of the second vantage point from the changes in distance, pitch, and yaw measurements from the two vantage points. No preparation of the space to be modeled is required and no markers are required.

Figure 8:
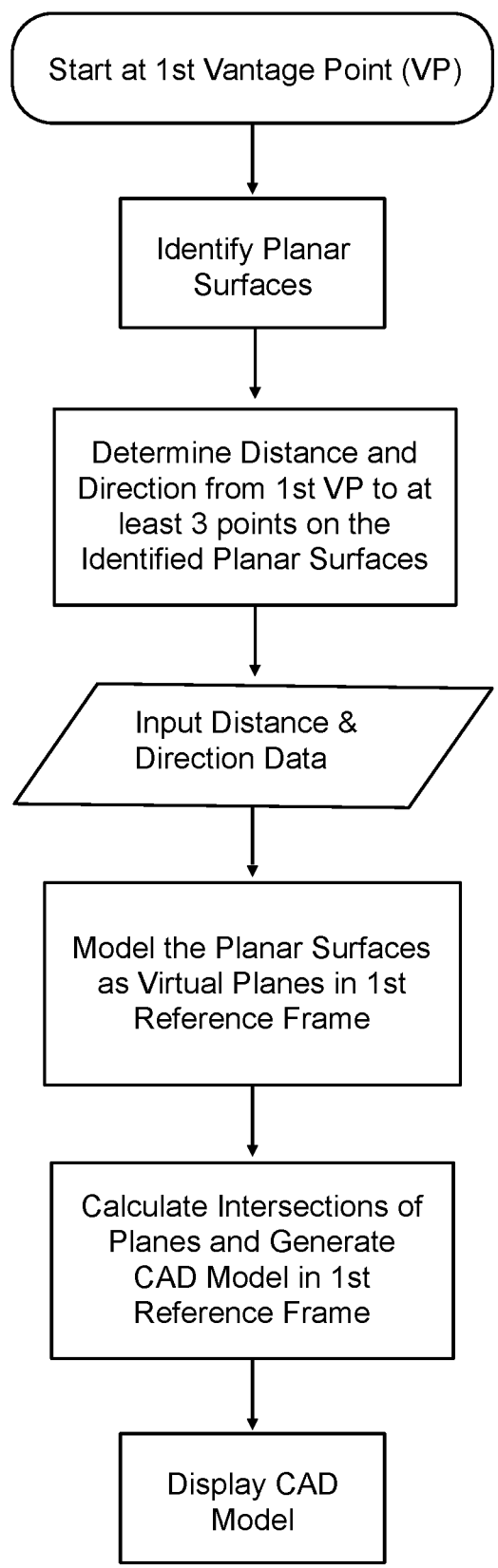
FIG. 8 is a flow chart for a second embodiment of a method according to the invention.

FIG. 8 is a flow chart illustrating method steps of another embodiment of a method comprising a step of identifying planar surfaces, which may be performed by an automated process. For example, many interior spaces are rooms that are comprised essentially square or rectangular surfaces. A vantage point may be selected in which one of the planar surfaces is essentially at 0 degrees yaw in the reference frame of the stage holding the DMD. In such instances, the model building software may have a preprogrammed setting for such geometries in which the stage is moved so that values for pitch and yaw are selected that results in the distances to three or more points on each wall, the floor, and/or the ceiling being measured without requiring a user to identify planar surfaces and pointing the DMD manually.

Figure 9:
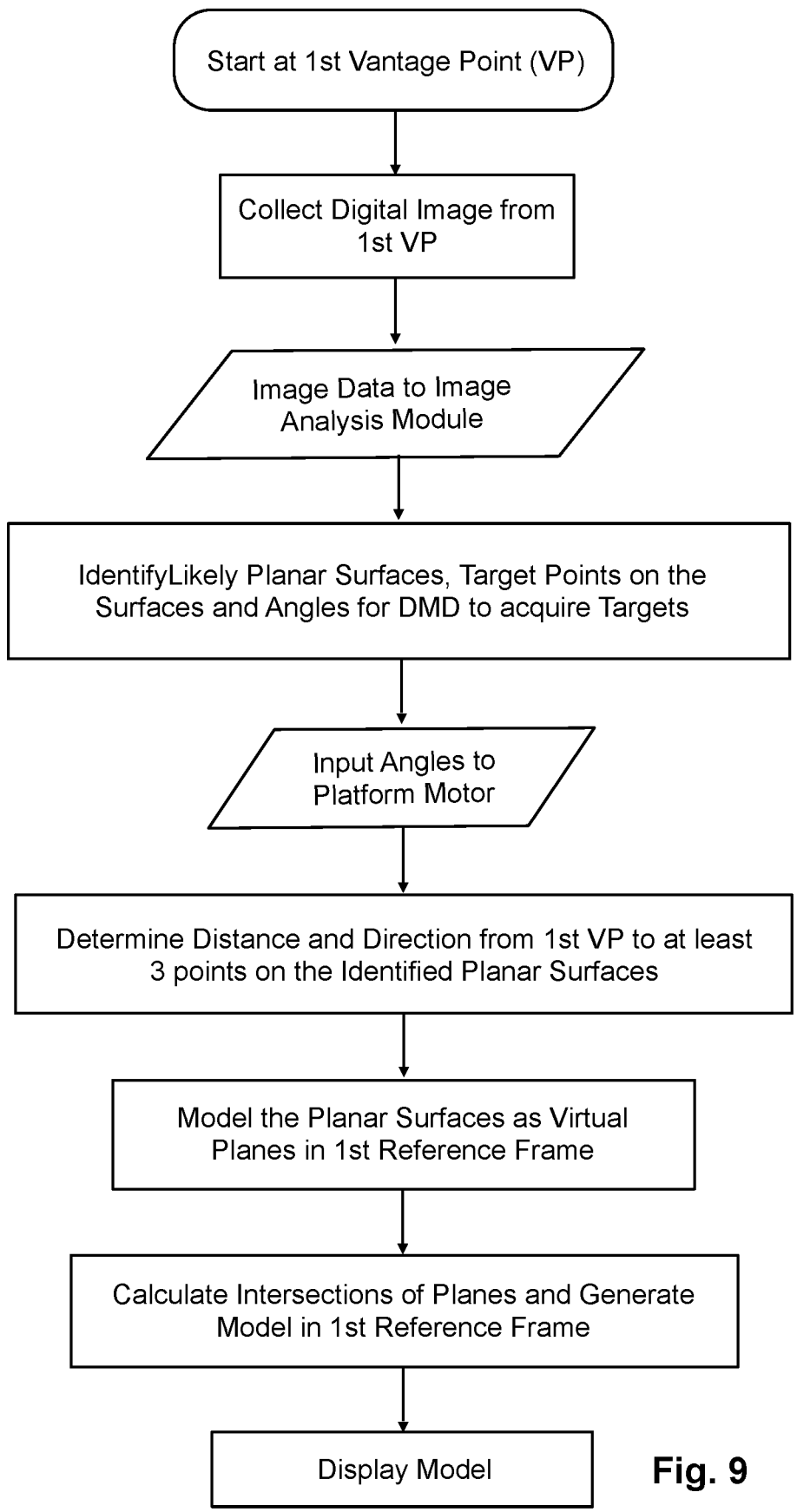
FIG. 9 is a flow chart for a third embodiment of a method according to the invention.
Figure 10:
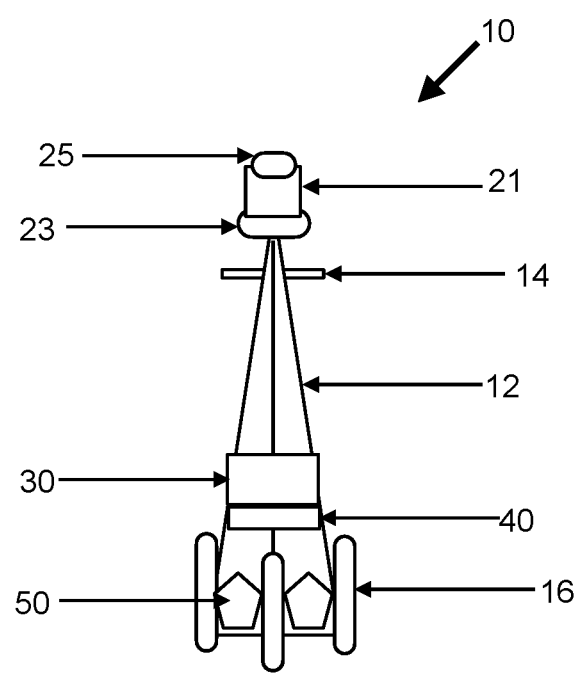
FIG. 10 is a schematic of an embodiment of a system according to the invention.

FIG. 9 is a flow chart illustrating method steps of yet another embodiment of a method in which the step of identifying likely planar surfaces, is performed with the use of a digital camera (25) and an image analysis module. The DMD (21) and camera (25) may be mounted to separate stages (23) that are optionally fixed relative to one another so that they move in unison. The DMD (21) and camera (25) may be mounted to the same motorized stage (23). The camera (25) communicates with the computer (30) to provide digital image data to the image analysis module on the computer (30) that uses artificial intelligence (AI) to identify the locations of likely planar surfaces. The computer (30) then directs the movement of the stage (23) to combinations of pitch and yaw that will point the DMD to at least three targets on each of the likely planar surfaces. In this way, the speed of the method can be increased when compared to manually moving the stage directly by hand or via an input device coupled to a motorized stage (23). The camera is only used to automate the selection/identification of surfaces and image data is not used for generating the 3D model. Only data from the DMD and stage are used for model generation.

The system and method are not limited to planar surfaces. Planar surfaces are by far the most common for ceilings, walls, and floors but these structures may also comprise curves.

For embodiments in which an operator identifies surfaces and aims the DMD, the operator may enter information into the model generating software that a collection of distance measuring data points are on the same curve. The software may then derive an equation that best fits the data points to a type of curve commonly used in architecture such as a half cylinder or half sphere. The model generating software may then calculate the intersection of virtual planes with the virtual curve(s) enclosing the space.

For embodiments involving a digital camera (25) to identify likely planar surfaces, the AI may be trained to recognize certain likely curved surfaces and direct the stage (23) and direct the computer to move the stage (23) to control the pitch and yaw of the DMD so that it detects the distances of points on the curved surface.

The invention claimed is:

1. A system for modeling an enclosed space, said system comprising:
   a single point time of flight distance measuring device (DMD) mounted to a stand through a motorized stage that indexes a pitch and a yaw of the DMD;
   a digital camera mounted to said stand;
   a computer; and
   a display
   wherein the computer comprises software configured to:
   receive a digital image from the digital camera, said digital image recording surfaces of the enclosed space from a static vantage point of the camera;
   identify locations of planar surfaces recorded in said digital image;
   direct the movement of the motorized stage to sequentially target three or more points on each of the planar surfaces, which locations are identified, with the DMD from a static vantage point of the DMD;
   receive pitch and yaw data from the motorized stage and distance data from the DMD for each of the three or more points on each of the planar surfaces;
   generate virtual planes corresponding to the planar surfaces in a virtual reference frame from said pitch and yaw data received from the motorized stage and distance data from the DMD;
   calculate where the virtual planes intersect to define plane intersections;
   use the virtual planes and defined plane intersections to generate a geometry for a 3D model representing the enclosed space; and
   display the 3D model representing the enclosed space on the display.

2. The system of claim 1, wherein the movable DMD stage is mounted to a stand, a cart, or a motorized remote-controlled mobile platform.

3. The system of claim 1, wherein the computer comprises software that fuses geometries generated from different vantage points of the DMD into a single, fused geometry in a single reference frame and wherein said 3D model representing the enclosed space is generated using the fused 3D geometry.

4. The system of claim 3, wherein the motorized stage is mounted to a device that measures the vertical height of the motorized stage from a floor.

5. The system of claim 1, wherein the computer further comprises software directing the computer to:
   identify a location of a curved surface recorded in said digital image;
   direct the movement of the motorized stage to sequentially target three or more points on the curved surface, which location is identified, with the DMD;
   receive pitch and yaw data from the motorized stage and distance data from the DMD for the three or more points on the curved surface;
   generate a virtual curve corresponding to the curved surface from pitch and yaw data received from the movable stage and distance data from the DMD;
   calculate where the virtual curve intersects the virtual planes and generate a geometry for a 3D model representing the enclosed space; and
   display the 3D model representing the enclosed space on the display.

6. The system of claim 1, wherein the digital camera and the DMD are mounted to the same motorized stage and move in unison with one another and wherein the vantage point of the digital camera and the vantage point of the DMD are functionally identical.

7. The system of claim 1, wherein the 3D model representing the enclosed space is generated and displayed in real time.

8. A method for generating a three-dimensional (3D) model of an enclosed space, said method comprising:
recording a digital image of said enclosed space from a using a digital camera, said digital image recording surfaces of the enclosed space from a first static vantage point of the digital camera;
transferring data of said digital image to a computer;
using said computer, identifying locations of planar surfaces recorded in said digital image;
using said computer, directing a movement of a motorized stage that indexes a pitch and a yaw of a single point time of flight distance measuring device (DMD) mounted thereto to sequentially target three or more points on each of the planar surfaces, which locations are identified, with the DMD from a first static vantage point of the DMD;
receiving pitch and yaw data from the motorized stage and distance data from the DMD for each of the three or more points on each of the planar surfaces into said computer;
generating virtual planes corresponding to the planar surfaces in a virtual reference frame from said pitch and yaw data received from the motorized stage and distance data from the DMD;
calculating where the virtual planes intersect to define plane intersections;
generating a geometry for a 3D model representing the enclosed space using the virtual planes and defined plane intersections; and
displaying the 3D model representing the enclosed space on the display.

9. The method of claim 8, wherein said displaying the 3-D model occurs in real time with respect to the measuring the distances from the first vantage point of the DMD.

10. The method of claim 8, further comprising:
using said computer, identifying a location of a curved surface recorded in said digital image recording surfaces of the enclosed space from said first static vantage point of the digital camera;
using said computer, directing the movement of the motorized stage to sequentially target three or more points on the curved surface, which location is identified, with the DMD from the first static vantage point of the DMD;
receiving pitch and yaw data from the motorized stage and distance data from the DMD for the three or more points on the curved surface into said computer;
generating a virtual curve corresponding to the curved surface in the virtual reference frame from said pitch and yaw data received from the motorized stage and distance data from the DMD;
calculating where the virtual curve intersects the virtual planes to define an intersection of the virtual curve with the virtual planes;
generating a geometry for a 3D model representing the enclosed space using the virtual planes, virtual curve, and defined intersection of the virtual curve with the virtual planes; and
displaying the 3D model representing the enclosed space on the display.

11. The method of claim 8, and further comprising:
recording a digital image of said enclosed space from a using said digital camera, said digital image recording surfaces of the enclosed space from a second static vantage point of the camera;
transferring data of said digital image to said computer;
using said computer, identifying locations of planar surfaces recorded in said digital image;
directing the movement of said motorized stage to sequentially target three or more points on each of the planar surfaces, which locations are identified, with the DMD from a second static vantage point of the DMD;
receiving pitch and yaw data from the motorized stage and distance data from the DMD for each of the three or more points on each of the planar surfaces into said computer;
generating virtual planes corresponding to the planar surfaces in said virtual reference frame from said pitch and yaw data received from the motorized stage and distance data from the DMD;
calculating where the virtual planes intersect to define plane intersections;
generating a geometry for a 3D model representing the enclosed space using the virtual planes and defined plane intersections calculated for the second vantage point of the DMD;
combining the 3D model representing the enclosed space generated from the second vantage point of the DMD with the 3D model representing the enclosed space generated from the first vantage point of the DMD to produce a combined 3D model representing the enclosed space; and
displaying the combined 3D model on the display.

12. The method of claim 11, wherein said method excludes the use of point cloud generation and simultaneous localization and mapping (SLAM) algorithms.

13. The method of claim 8, wherein the first vantage point of the digital camera and the first vantage point of the DMD are functionally identical.

14. The method of claim 8, wherein said method is operable without the use of markers placed at known positions in the enclosed space.

* * * * *